United States Patent
Lee et al.

(10) Patent No.: US 6,182,170 B1
(45) Date of Patent: *Jan. 30, 2001

(54) METHOD FOR REPLACING PROGRAM IN PORTABLE INFORMATION TERMINAL USING UTILITY PROGRAM AND NEW PROGRAM RECEIVED VIA COMMUNICATION UNIT AND DETERMINING UTILITY PROGRAM APPROPRIATENESS FOR REPLACEMENT

(75) Inventors: Jin-chul Lee, Anyang; Chae-hee Won; Jun-il Hong, both of Seoul, all of (KR)

(73) Assignee: Samsung Electronics Co., Ltd., Kyungki-Do (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/038,968

(22) Filed: Mar. 12, 1998

(30) Foreign Application Priority Data

Apr. 11, 1997 (KR) .................................................. 97-13419

(51) Int. Cl.[7] .......................... G06F 17/24; G06F 17/00; G06F 3/00; G06F 13/14; G06F 15/00

(52) U.S. Cl. .............................. 710/65; 710/1; 707/203; 707/511; 709/217

(58) Field of Search .......................... 395/200.47, 828, 395/830, 651, 652, 653; 709/217; 710/8, 10, 1, 65; 713/1, 2, 100; 707/203, 511

(56) References Cited

U.S. PATENT DOCUMENTS

| 5,590,373 |   | 12/1996 | Whitley et al. ....................... 395/828 |
| 5,655,154 | * | 8/1997 | Jain et al. ............................. 395/899 |
| 5,757,639 | * | 5/1998 | Yamada ................................ 364/131 |
| 5,832,275 | * | 11/1998 | Olds ..................................... 395/712 |
| 5,835,761 | * | 11/1998 | Ishii et al. ............................ 395/653 |
| 5,835,911 | * | 11/1998 | Nakagawa et al. .................. 707/203 |
| 5,838,916 | * | 11/1998 | Domenikos et al. .......... 395/200.49 |
| 5,844,796 | * | 12/1998 | Araki ................................... 364/191 |
| 5,878,256 | * | 3/1999 | Bealkowski et al. ................ 395/652 |
| 5,892,952 | * | 4/1999 | Seko et al. .......................... 395/712 |
| 5,913,218 | * | 6/1999 | Carney et al. ....................... 707/200 |
| 5,930,504 | * | 7/1999 | Gabel .................................. 395/652 |
| 6,003,083 | * | 12/1999 | Anderson ................................ 713/2 |
| 6,009,274 | * | 12/1999 | Fletcher et al. ..................... 395/712 |
| 6,023,727 | * | 2/2000 | Barrett et al. ....................... 709/211 |
| 6,078,951 | * | 6/2000 | Pashupathy et al. ............... 709/217 |

FOREIGN PATENT DOCUMENTS

| 0 628 908 | 12/1994 | (EP) | ............................. G06F/9/445 |
| 7-73042 | 3/1995 | (JP) | ............................. G06F/9/445 |
| 7-84776 | 3/1995 | (JP) | ............................... G06F/9/06 |
| 8-123678 | 5/1996 | (JP) | ............................... G06F/9/06 |
| 8-123678 | 6/1996 | (JP) | . |

* cited by examiner

*Primary Examiner*—Thomas C. Lee
*Assistant Examiner*—Tanh Quang Nguyen
(74) *Attorney, Agent, or Firm*—Sughrue, Mion, Zinn, Macpeak & Seas, PLLC

(57) ABSTRACT

There is provided a method for replacing a program stored in portable information terminal including a communication unit for transmitting to and receiving data from an external device, a memory unit for temporarily storing a new program and a utility program operating to carry out the replacement of a prestored program, which are received from the communication unit, and a program storage unit for storing the prestored program and replacing the prestored program with the new program. The method comprises the steps of receiving the new and utility programs via the communication unit from an external, storing the new and utility programs in the memory unit, and replacing the prestored program stored in the program storage unit with the new program, using the utility program. As described above, the program of a portable information terminal is replaced using a communication unit instead of an external card, so that the program can be replaced at low cost.

3 Claims, 4 Drawing Sheets

METHOD FOR REPLACING PROGRAM IN PORTABLE INFORMATION TERMINAL USING UTILITY PROGRAM AND NEW PROGRAM RECEIVED VIA COMMUNICATION UNIT AND DETERMINING UTILITY PROGRAM APPROPRIATENESS FOR REPLACEMENT

BACKGROUND OF THE INVENTION

1. Field of the Invention

The present invention relates to a method for replacing a program stored in portable information terminal equipment, and more particularly, to a method for replacing a program stored in a program storage unit of a portable information terminal using a communication unit.

2. Description of Related Art

In general, a portable information terminal operating as a multi-media product having many functions (e.g., a cellular phone, a wireless facsimile, a wireless pager, and an electronic pocketbook) can search for information at any time or place while being carried in a user's hand, and transmit and receive data by being connected to external devices such as a computer.

The portable information terminal cannot provide as many functions as a computer, since it must be manufactured as small as possible, and can run only a small program because of its small memory capacity. That is, portable information terminals generally include a small-capacity ROM (read only memory) or EPROM (programmable ROM), and a random access memory (RAM) or a personal computer memory card industry association (PCMCIA) card. Although the ROM is low-priced, a program stored therein cannot be changed. On the other hand, a program stored in a RAM can be easily be changed, but the RAM is expensive and prone to damage by events such as power failure. Likewise, the PCMCIA card is expensive. As a result of the small memory capacity, the portable information terminal must be able to add a new program or replace a prestored program with a new program, as needed.

FIG. 1 shows the configuration of a conventional portable information terminal which is disclosed in U.S. Pat. No. 5,590,373. A new program which is to replace a prestored program in a ROM 122 is recorded in a PCMCIA card 126. Also, a utility program operates to replace the prestored program recorded in the ROM 122 with the new program. The utility program is executed by being transferred through a PCMCIA receptacle 124 to a RAM 128 together with the new program. A particular bit combination in an option connector 120 informs a controller 130 that the PCMCIA card 126 having the new program recorded therein is being inserted into the terminal's main body. At this time, the controller 130 transfers the utility program in the PCMCIA card 126 to the RAM 128 and then executes the transferred utility program. Here, the utility program operates to replace the prestored program in the ROM 122 with the new program in the PCMCIA card 126. A decoder 116 interprets an option of the option connector 120. A power supply 112 supplies current to a static current generating device (not shown) of the option connector 120 through a connector receptacle 118. A program replacement method in the conventional portable information terminal cannot be applied to equipment which does not include the PCMCIA card 126. Further, special units such as the option connector 120 and the connector receptacle 118 are required to begin replacing the program in the ROM 122.

SUMMARY OF THE INVENTION

To solve the above problems, an object of the present invention is to provide a method for replacing a program stored in a program storage unit via a communication unit.

To accomplish the above object, there is provided a method of replacing a program in portable information terminal equipment including a communication unit for transmitting to and receiving data from an external device, a memory unit for temporarily storing a new program and a utility program operating to carry out the replacement of a prestored program, which are received from the communication unit, and a program storage unit for storing the prestored program and replacing the prestored program with the new program. The method comprises the steps of (a) receiving the new and utility programs from an external device via the communication unit, and storing the new and utility programs in the memory unit; and (b) replacing the prestored program in the program storage unit with the new program, using the utility program.

The step (a) comprises the substeps of: storing in the memory unit the new and utility programs received via the communication unit from the external device; and (a2) checking the size and checksum of the new and utility programs stored in the memory unit to determine whether the new and utility programs were correctly transmitted.

The step (b) comprises the substeps of: (b1) changing the program storage unit into a deletion and writing mode when the new program was normally stored in the memory unit; (b2) deleting the prestored program in the program storage unit; (b3) storing the new program in the program storage unit; (b4) changing the program storage unit into a reading mode when the storage of the new program in the program storage unit is completed; and (b5) initializing the new program stored in the program storage unit if the new program was correctly stored in the program storage unit.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
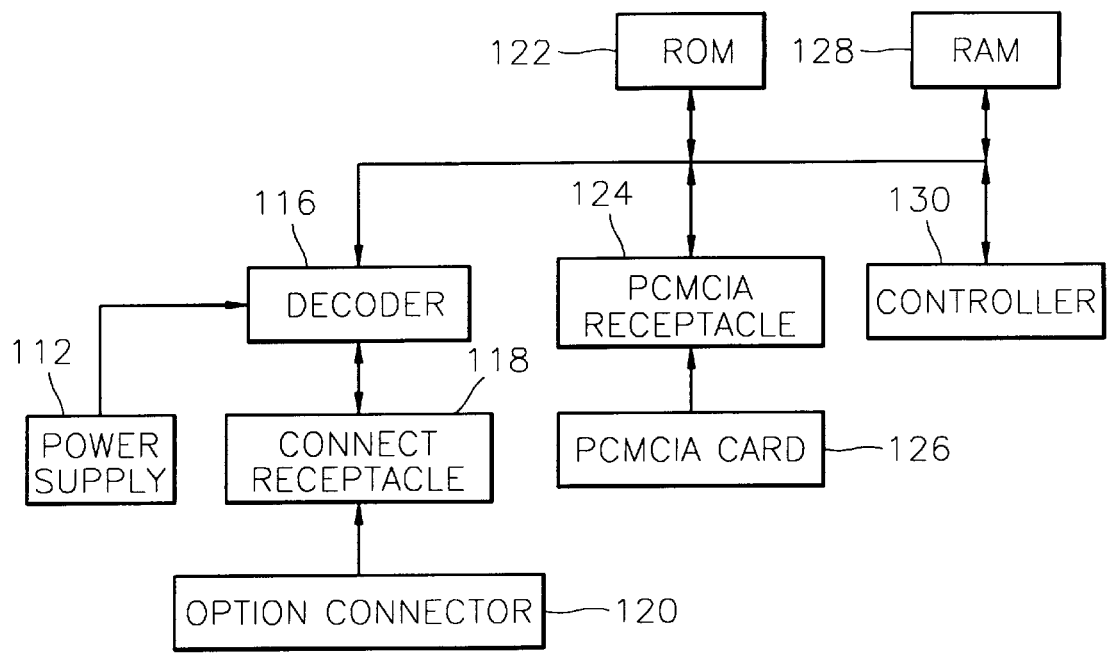
FIG. 1 is a block diagram of a conventional portable information terminal.
Figure 2:
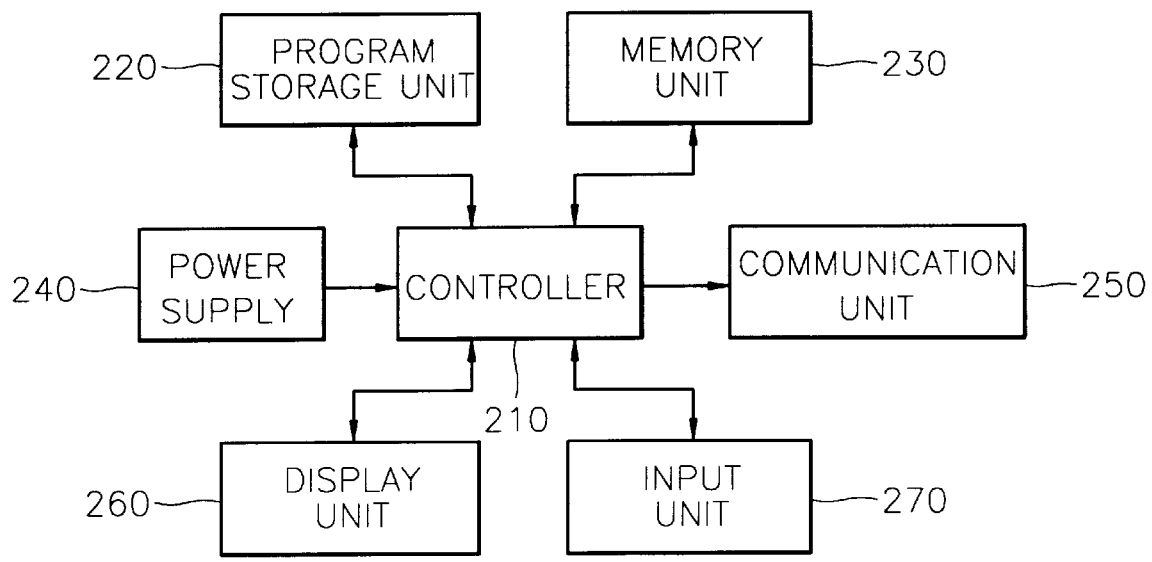
FIG. 2 is a block diagram of a typical portable information terminal to which the present invention can be applied.

Referring to FIG. 2, a typical portable information terminal, to which the present invention is to be applied, includes a controller 210, a program storage unit 220, a memory unit 230, a power supply 240, a communication unit 250, a display unit 260 and an input unit 270.

The controller 210 executes a program stored in the program storage unit 220 or the memory unit 230 if power is applied by the power supply 240 and a key signal is applied by the input unit 270, and controls the display of the results of the execution of the program on the display unit 260.

The program storage unit 220 stores a program that the controller 210 can execute. The program storage unit 220 stores data when a voltage lower than or equal to a predetermined level is supplied or no power is supplied, and can erase stored data or store new data when a voltage that is greater than or equal to the predetermined level is supplied, as can an EPROM or flash memory. The program storage unit 220 stores basic programs and data which are required to operate a system, and which are not changed under typical conditions.

The memory unit 230 stores a program which can be executed by the controller 210 and data which is used by the program, and is capable of being read and written to, like a RAM. The program stored in the memory unit 230 is executed with the assistance of the program stored in the program storage unit 220, and can be deleted or changed.

The communication unit 250 allows the portable information terminal system and another external device (not shown) to exchange data, and can use a telephone line, radio frequency, infra-red transmission, or the like.

Figure 3:
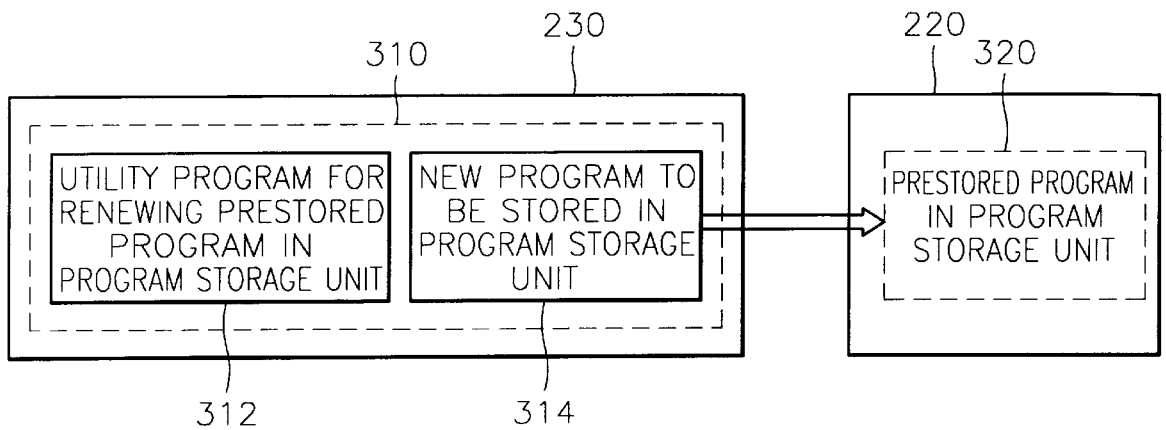
FIG. 3 is a detailed view of a program storage unit and a memory unit shown in FIG. 2.

FIG. 3 is a detailed view of the program storage unit 220 and the memory unit 230 shown in FIG. 2. Reference numeral 310 denotes programs stored in the memory unit 230. The programs are a utility program 312 which operates to replace a program already stored in the program storage unit 220 and a new program 314 to be stored in the program storage unit 220. Also, reference numeral 320 denotes a program prestored in the program storage unit 220.

Figure 4:
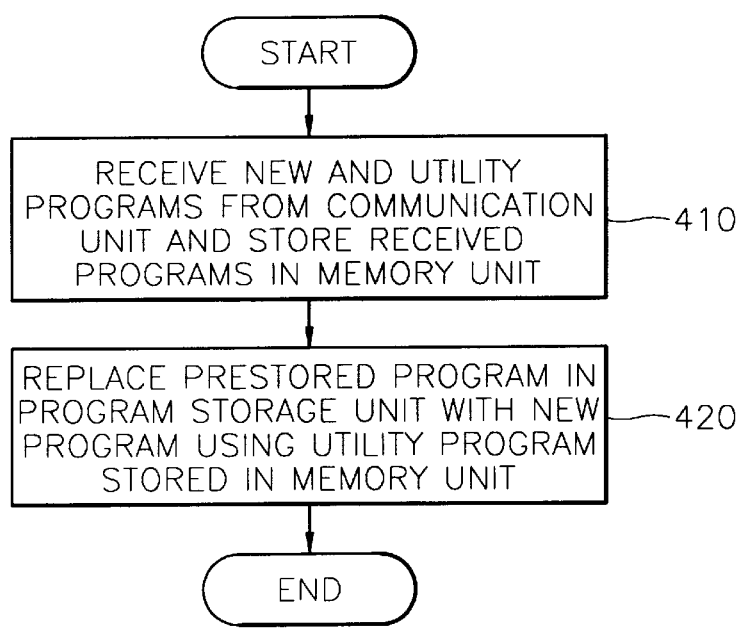
FIG. 4 is a flowchart illustrating a method for replacing a program in portable information terminal equipment, according to the present invention.

FIG. 4 is a flowchart illustrating a method for replacing a program in portable information terminal equipment, according to the present invention. The method is comprised of a first step 410 of receiving the utility program 312 and new program 314 from the communication unit 250 and a second step 420 of replacing the prestored program 320 in the program storage unit 220 with the new program 314, using the utility program 312.

Figure 5:
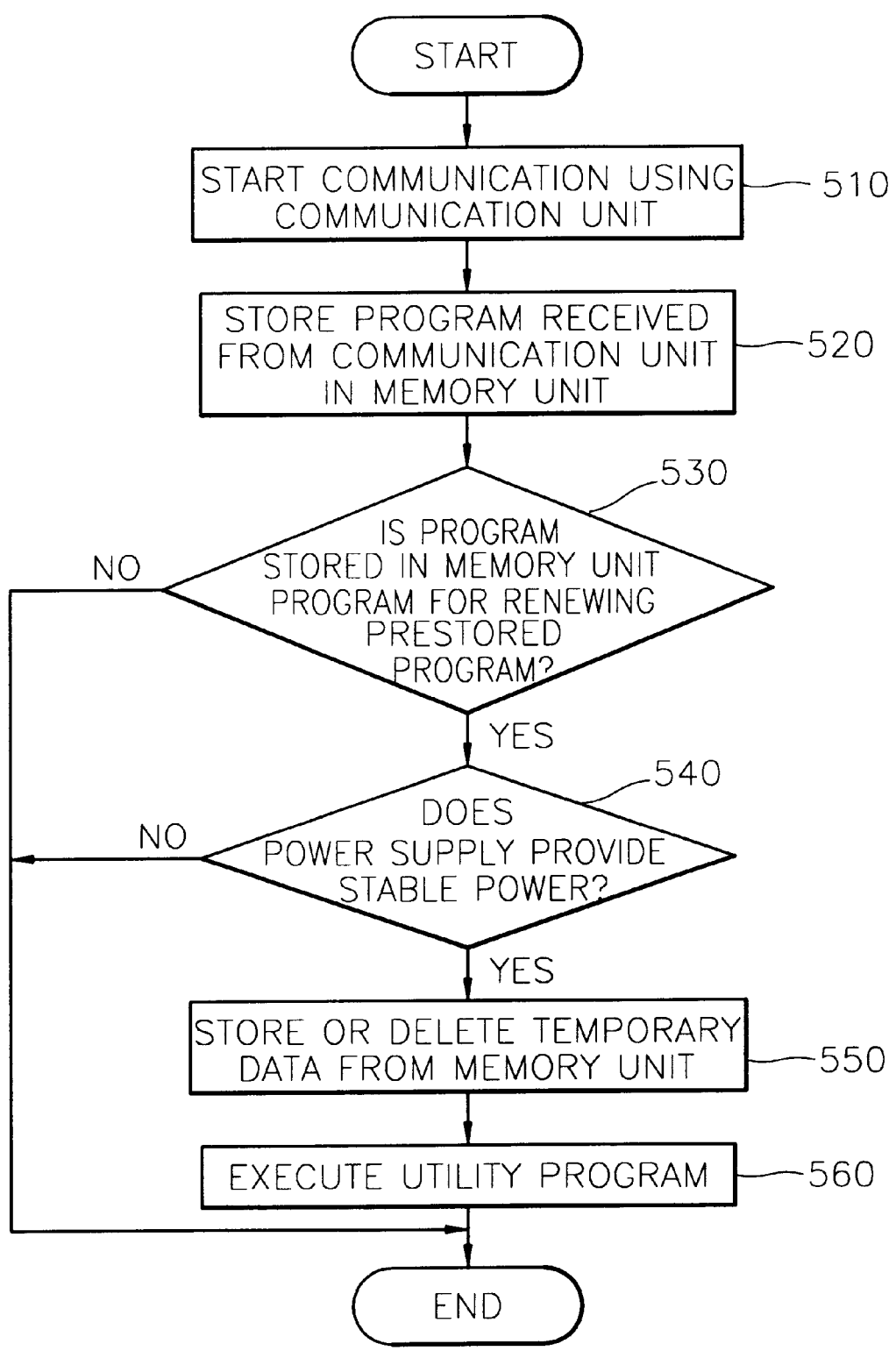
FIG. 5 is a detailed flowchart of a first step shown in FIG. 4.

FIG. 5 is a detailed flowchart of the first step 410 shown in FIG. 4. In step 510, communication is started with an external device using the communication unit 250. In step 520, the utility program 312 and the new programs received from the external device via the communication unit 250 are stored in the memory unit 230. In step 530, it is determined whether the utility and new programs 312 and 314 stored in the memory unit 230 are programs for replacing the prestored program 320 in the program storage unit 220. Here, in order to accomplish the determination of step 530, the filenames of the utility and new programs 312 and 314 can be compared with prearranged reserved filenames, or a specification describing the content of a program can be checked. If it is determined in step 530 that the utility and new programs 312 and 314 stored in the memory unit 230 are programs for replacing the prestored program 320 in the program storage unit 220, it is determined whether the power supply supplies a stable voltage, in step 540. Here, it must be checked whether the power supply 240 can supply a sufficient voltage and current to replace the prestored program 320 in the program storage unit 220, before the utility program 312 is executed. If the power supply provides a sufficient voltage, data temporarily stored in the memory unit 230 is permanently stored or deleted, in step 550. That is, temporary data of programs other than the utility and new programs 312 and 314 is stored elsewhere or deleted, in order to secure enough space to execute the utility program 312 in the memory unit 230. In step 560, the utility program 312 is executed. Here, after the utility program 312 has been executed, the other programs stored in the program storage unit 220 are prevented from being executed.

Figure 6:
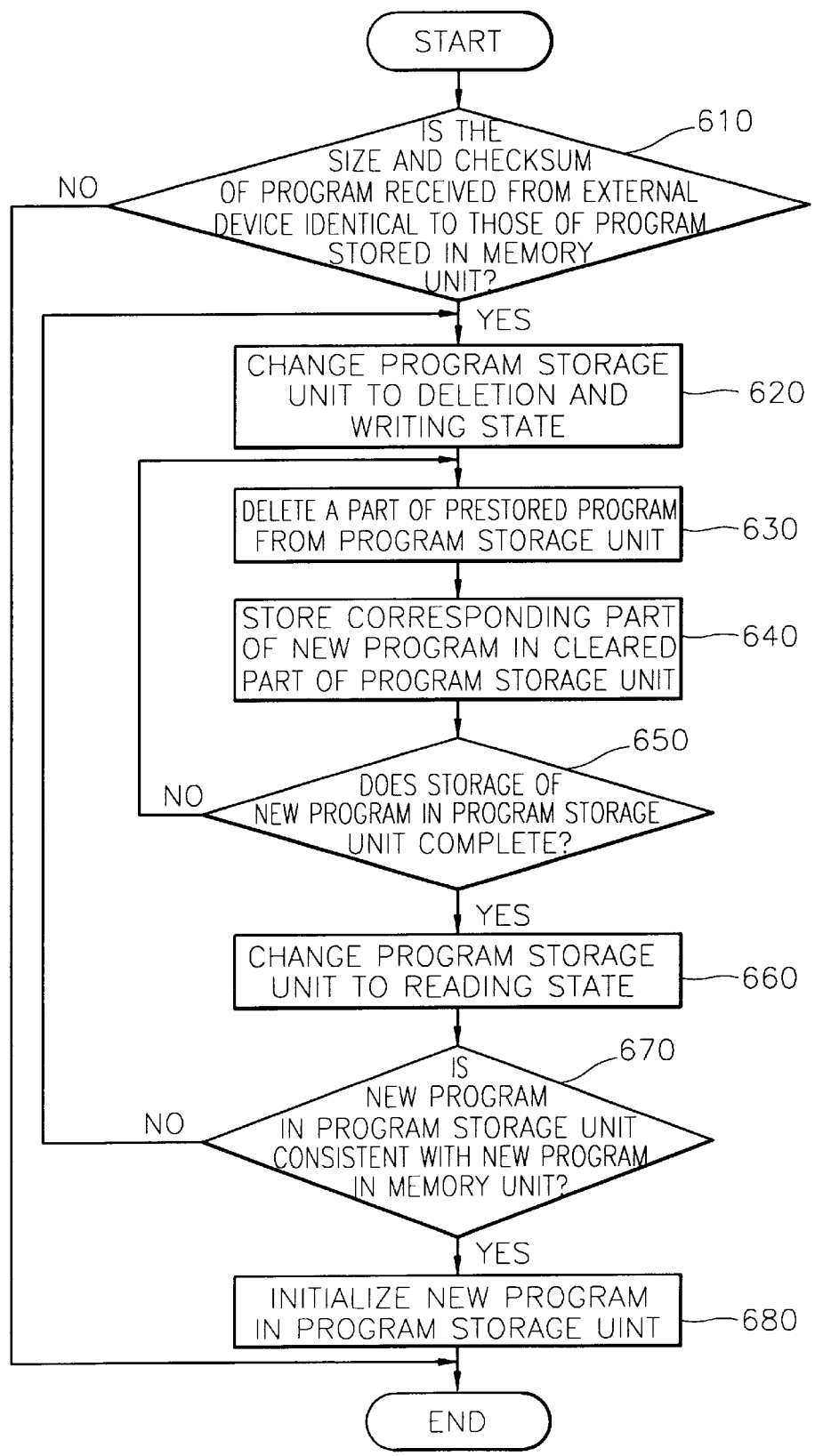
FIG. 6 is a detailed flowchart of a second step shown in FIG. 4.

FIG. 6 is a detailed flowchart of the second step 420 of FIG. 4. First, a determination is made of whether the size and checksum of a program received from an external device are equal to the size and checksum of the programs which are stored in the memory unit 230, in step 610. That is, the size and the checksum are used to check whether the utility program 312 and the new program 314 have been properly transmitted from the external device and stored in the memory unit 230. If it is determined that the compared values are identical to each other in step 610, the program storage unit 220 is placed into a deletion and writing mode, in step 620. In step 630, a part of the prestored program 320 in the program storage unit 220 is deleted. In step 640, a part of the new program 314 is stored in the cleared part of the program storage unit 220. Next, it is determined whether the new program 314 is completely stored in the program storage unit 220, in step 650. The steps 630 and 640 are repeated until the new program 314 completely replaces the program 320 originally prestored in the program storage unit 220. When the storage of the new program 314 is completed in step 650, the program storage unit 220 is changed to a reading mode, in step 660. In step 670, the contents of the new program in the program storage unit 220 is compared with that of the new program in the memory unit 230, to find out if they are identical. If it is determined in step 670 that the contents of the programs are identical to each other, the new program in the program storage unit 220 is initialized, in step 680.

According to the present invention described above, the program stored in a portable information terminal is replaced using a communication unit instead of an external card, so that the program can be replaced at low cost.

What is claimed is:

1. A method of replacing a program stored in a portable information terminal, said portable information terminal comprising a communication unit for transmitting to and receiving data from an external device, a memory unit for temporarily storing a new program and a utility program operating to carry out the replacement of a prestored program with the new program and a program storage unit for storing the prestored program and for replacing the prestored program with the new program, said method comprising:

(a) receiving the new program and the utility program from an external device via said communication unit, and storing the new program and the utility program in said memory unit; and (b) replacing the prestored program in said program storage unit with the new program, using the utility program;

wherein (a) comprises:

(a1) storing in said memory unit the new program and the utility program received from said external device via said communication unit; and (a2) determining whether the new program stored in said memory unit is a program for replacing the prestored program stored in said program storage unit and determining whether the utility program stored in said memory unit is appropriate for replacing the prestored program with the new program.

2. The method of replacing a program stored in a portable information terminal as claimed in claim 1, wherein step (a) further comprises:

(a3) determining whether a power supply in said portable information terminal can supply a sufficient voltage and current to replace the prestored programed stored in said program storage unit;

(a4) removing any programs, other than the new program and the utility program, which are temporarily stored in said memory unit to secure sufficient space to execute the utility program; and (a5) executing the utility program stored in said memory unit if it is determined said power supply can supply a sufficient voltage in said (a3).

3. The method of replacing a program stored in a portable information terminal as claimed in claim 1, wherein said (b) comprises of:

(b1) checking a size and checksum of the new program and the utility program stored in said memory unit to determine whether the new program and the utility program were correctly transmitted from said external device and stored in said memory unit;

(b2) placing said program storage unit into a deletion and writing mode if the new program was correctly stored in said memory unit;

(b3) deleting the prestored program in said program storage unit;

(b4) storing the new program in said program storage unit;

(b5) placing said program storage unit into a reading mode when the storage of the new program in said program storage unit is completed; and (b6) initializing the new program stored in said program storage unit if the new program was correctly stored in said program storage unit.

\* \* \* \* \*